US007067595B2

(12) United States Patent
Zarnoch et al.

(10) Patent No.: US 7,067,595 B2
(45) Date of Patent: Jun. 27, 2006

(54) POLY (ARYLENE ETHER) COMPOSITION AND METHOD

(75) Inventors: Kenneth Paul Zarnoch, Scotia, NY (US); John Robert Campbell, Clifton Park, NY (US); Glen David Merfeld, Loudonville, NY (US); John Austin Rude, Ballston Lake, NY (US); Prameela Susarla, Clifton Park, NY (US); Michael Alan Vallance, Loudonville, NY (US); Gary William Yeager, Rexf rd, NY (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 10/678,459

(22) Filed: Oct. 3, 2003

(65) Prior Publication Data

US 2005/0075463 A1    Apr. 7, 2005

(51) Int. Cl.
  *C08L 71/12*    (2006.01)
  *C08F 283/08*   (2006.01)
(52) U.S. Cl. .................. 525/391; 525/392; 524/345; 524/347; 524/508; 526/210
(58) Field of Classification Search ............... 524/345, 524/347; 525/391, 392; 526/210
See application file for complete search history.

(56) References Cited

U.S. PATENT DOCUMENTS

| 3,306,875 | A |   | 2/1967  | Hay            |         |
|-----------|---|---|---------|----------------|---------|
| 3,375,228 | A |   | 3/1968  | Holoch et al.  |         |
| 3,656,980 | A | * | 4/1972  | Harada et al.  | 106/285 |
| 4,148,843 | A |   | 4/1979  | Goossens       |         |
| 4,290,938 | A |   | 9/1981  | Miyake et al.  |         |
| 4,562,243 | A |   | 12/1985 | Percec         |         |
| 4,634,742 | A |   | 1/1987  | Percec         |         |
| 4,663,402 | A |   | 5/1987  | Percec et al.  |         |
| 4,665,137 | A |   | 5/1987  | Percec         |         |
| 4,677,185 | A |   | 6/1987  | Heitz et al.   |         |
| 4,701,514 | A |   | 10/1987 | Percec         |         |
| 4,760,118 | A |   | 7/1988  | White et al.   |         |
| H521      | H |   | 9/1988  | Fan            |         |
| 4,806,601 | A |   | 2/1989  | Percec         |         |
| 4,923,932 | A |   | 5/1990  | Katayose et al.|         |
| 5,071,922 | A |   | 12/1991 | Nelissen et al.|         |
| 5,079,268 | A |   | 1/1992  | Nelissen et al.|         |
| 5,091,480 | A |   | 2/1992  | Percec         |         |
| 5,102,605 | A | * | 4/1992  | Kagaya et al.  | 264/257 |
| 5,171,761 | A |   | 12/1992 | Penco et al.   |         |
| 5,218,030 | A |   | 6/1993  | Katayose et al.|         |
| 5,219,951 | A |   | 6/1993  | Nelissen et al.|         |
| 5,304,600 | A |   | 4/1994  | Nelissen et al.|         |
| 5,310,820 | A |   | 5/1994  | Nelissen et al.|         |
| 5,338,796 | A |   | 8/1994  | Vianello       |         |
| 5,352,745 | A |   | 10/1994 | Katayose et al.|         |
| 5,407,972 | A |   | 4/1995  | Smith et al.   |         |
| 5,834,565 | A |   | 11/1998 | Tracy et al.   |         |
| 5,965,663 | A |   | 10/1999 | Hayase         |         |
| 6,051,662 | A |   | 4/2000  | Tracy et al.   |         |
| 6,251,308 | B1|   | 6/2001  | Butler         |         |

| 6,352,782    | B1 |   | 3/2002  | Yeager et al.   |         |
|--------------|----|---|---------|-----------------|---------|
| 6,355,832    | B1 |   | 3/2002  | Weferling et al.|         |
| 6,384,176    | B1 |   | 5/2002  | Braat et al.    |         |
| 6,388,046    | B1 |   | 5/2002  | Campbell et al. |         |
| 6,469,124    | B1 |   | 10/2002 | Braat et al.    |         |
| 6,521,703    | B1 |   | 2/2003  | Zarnoch et al.  |         |
| 6,534,673    | B1 |   | 3/2003  | Weferling et al.|         |
| 6,547,992    | B1 |   | 4/2003  | Schlosser et al.|         |
| 6,569,982    | B1 |   | 5/2003  | Hwang et al.    |         |
| 6,617,398    | B1 |   | 9/2003  | Yeager et al.   |         |
| 6,627,704    | B1 |   | 9/2003  | Yeager et al.   |         |
| 6,627,708    | B1 |   | 9/2003  | Braat et al.    |         |
| 6,794,481    | B1 |   | 9/2004  | Amagai et al.   |         |
| 6,835,786    | B1 | * | 12/2004 | Ishii et al.    | 525/397 |
| 2002/0161091 | A1 |   | 10/2002 | Amou et al.     |         |
| 2002/0169256 | A1 |   | 11/2002 | Merfeld et al.  |         |
| 2002/0173597 | A1 |   | 11/2002 | Zarnoch et al.  |         |
| 2002/0177027 | A1 |   | 11/2002 | Yeager et al.   |         |
| 2003/0096123 | A1 |   | 5/2003  | Yeager          |         |
| 2003/0215588 | A1 |   | 11/2003 | Yeager et al.   |         |
| 2004/0146692 | A1 |   | 7/2004  | Inoue et al.    |         |
| 2005/0075462 | A1 | * | 4/2005  | Zarnoch et al.  | 525/391 |

FOREIGN PATENT DOCUMENTS

| DE | 31 17 514 A1 | 5/1981  |
|----|--------------|---------|
| DE | 41 03 140 A1 | 2/1991  |
| EP | 0 261 574 B1 | 11/1991 |

OTHER PUBLICATIONS

Encyclopedia of Polymer Science vol. 15 p. 544-545.*
C. Pugh and V. Percec, Polym. Prepr. (Am. Chem. Soc., Div. Polym. Chem.) (1985), 26 (2), 303-5.
"Plastics Additives Handbook 4th Edition" R. Gachter and H. Muller (eds.), P.P. Klemchuck (assoc. ed.) Hanser Publishers, New York 1993, pp. 901-948.
S. J. Monte et al, Ann. Chem. Tech. Conf. SPI (1980), Ann. Tech. Conf. Reinforced Plastics and Composite Inst. SPI (1979), Section 16E, New Orleans, pp. 1-10.
L. B. Cohen, "Zircoaluminates Strengthen Premium Ranges of Chemical Coupling Agents", Plastics Engineering, vol. 39, No. 11, (1983) pp. 29-32.
S. J. Monte et al., "Coupling Composites With Titanate During Extrusion Process", Modern Plastics, May (1984), pp. 74, 76, and 78.
International Search Report International Application No. PCT/US2004/031685; International Filing Date Sep. 27, 2004; Date of Mailing Dec. 22, 2004 (6 pgs).

* cited by examiner

*Primary Examiner*—David J. Buttner
(74) *Attorney, Agent, or Firm*—Cantor Colburn LLP

(57) ABSTRACT

A curable composition includes a functionalized poly (arylene ether), an olefinically unsaturated monomer, about 0.2 to about 5 parts by weight of a curing initiator per 100 parts by weight total of the functionalized poly(arylene ether) and the olefinically unsaturated monomer, and about 0.005 to about 1 part by weight of a curing inhibitor per 100 parts by weight total of the functionalized poly(arylene ether) and the olefinically unsaturated monomer. The weight ratio of the curing initiator to the curing inhibitor is about 1.2:1 to about 50:1. The composition provides improved and reproducible flow during the early stages of molding without compromising curing time. The composition is useful for preparing plastic-packaged electronic devices.

39 Claims, No Drawings

POLY (ARYLENE ETHER) COMPOSITION AND METHOD

BACKGROUND OF THE INVENTION

Curable compositions with polymerizable poly(arylene ether) resins and co-monomers such as styrene and acrylate esters have been described, for example, in U.S. Pat. No. 6,352,782 B2 to Yeager et al, and U.S. patent application Publication No. 2001-0053820 A1 to Yeager et al. One potential use for such compositions is for fabricating plastic-packaged electronic devices. Experience in the fabrication of these devices has suggested the need for curable compositions that exhibit increased flow during the early stages of molding without increasing the total time required for curing.

BRIEF DESCRIPTION OF THE INVENTION

An improved balance of total curing time and increased flow during the early stages of curing is exhibited by a curable composition comprising a functionalized poly (arylene ether), an olefinically unsaturated monomer, about 0.2 to about 5 parts by weight of a curing initiator per 100 parts by weight total of the functionalized poly(arylene ether) and the olefinically unsaturated monomer, and about 0.005 to about 1 part by weight of a curing inhibitor per 100 parts by weight total of the functionalized poly(arylene ether) and the olefinically unsaturated monomer, wherein the weight ratio of the curing initiator to the curing inhibitor is about 1.2:1 to about 50:1.

Other embodiments, including a cured composition, an article comprising the cured composition, and a method of preparing the curable composition, are described in detail below.

DETAILED DESCRIPTION OF THE INVENTION

One embodiment is a curable composition comprising a functionalized poly(arylene ether), an olefinically unsaturated monomer, about 0.2 to about 5 parts by weight of a curing initiator per 100 parts by weight total of the functionalized poly(arylene ether) and the olefinically unsaturated monomer, and about 0.005 to about 1 part by weight of a curing inhibitor per 100 parts by weight total of the functionalized poly(arylene ether) and the olefinically unsaturated monomer, wherein the weight ratio of the curing initiator to the curing inhibitor is about 1.2:1 to about 50:1.

The present inventors conducted extensive research to find a composition that would exhibit the desirable characteristics usually associated with poly(arylene ether)-based thermosets, such as high glass transition temperature, low coefficient of thermal expansion, and low dielectric constant, while exhibiting molding characteristics similar to those of the epoxy thermoset resins currently favored by the marketplace. Early research indicated that the composition cured rapidly, but that it exhibited less than desired flow during the early stages of curing. Extensive experimentation revealed that improved flow and improved reproducibility of flow could be achieved without sacrificing overall curing times by using relatively high concentrations of curing initiators and curing inhibitors, and by carefully controlling the ratio of these two components. The improved flow is manifested, for example, as increased spiral flow, as described in the working examples below.

The composition comprises a functionalized poly(arylene ether). The functionalized poly(arylene ether) may be a capped poly(arylene ether), a ring-functionalized poly (arylene ether), or an acid- or anhydride-functionalized poly(arylene ether).

A capped poly(arylene ether) is defined herein as a poly(arylene ether) in which at least 50%, preferably at least 75%, more preferably at least 90%, yet more preferably at least 95%, even more preferably at least 99%, of the free hydroxyl groups present in the corresponding uncapped poly(arylene ether) have been functionalized by reaction with a capping agent. The capped poly(arylene ether) may be represented by the structure

wherein Q is the residuum of a monohydric, dihydric, or polyhydric phenol, preferably the residuum of a monohydric or dihydric phenol, more preferably the residuum of a monohydric phenol; y is 1 to 100; J comprises repeating structural units having the formula

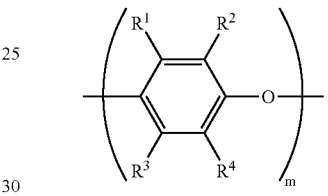

wherein m is 1 to about 200, preferably 2 to about 200, and $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; and K is a capping group produced by reaction of a phenolic hydroxyl group on the poly(arylene ether) with a capping agent. The resulting capping group, K, may be

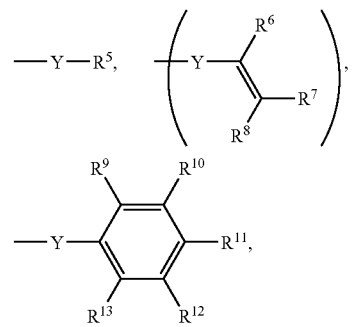

or the like, wherein $R^5$ is $C_1$–$C_{12}$ hydrocarbyl optionally substituted with one or two carboxylic acid groups, or the like; $R^6$–$R^8$ are each independently hydrogen, $C_1$–$C_{18}$ hydrocarbyl optionally substituted with one or two carboxylic acid groups, $C_2$–$C_{18}$ hydrocarbyloxycarbonyl, nitrile, formyl, carboxylic acid, imidate, thiocarboxylic acid, or the like; $R^9$–$R^{13}$ are each independently hydrogen, halogen, $C_1$–$C_{12}$ alkyl, hydroxy, amino, carboxylic acid, or the like; and wherein Y is a divalent group such as

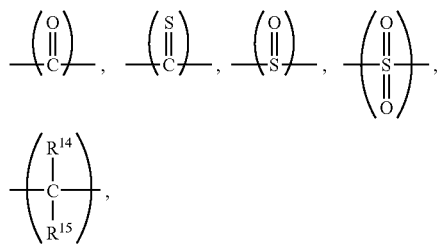

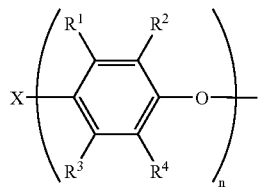

or the like, wherein $R^{14}$ and $R^{15}$ are each independently hydrogen, $C_1$–$C_{12}$ alkyl, or the like. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, carboxylic acid groups, halogen atoms, or the like, or it may contain heteroatoms within the backbone of the hydrocarbyl residue.

In one embodiment, Q is the residuum of a phenol, including polyfunctional phenols, and includes radicals of the structure

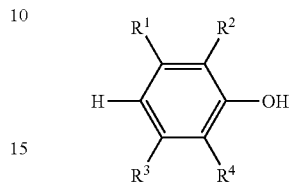

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_2$–$C_{12}$ halohydrocarbyloxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_2$–$C_{12}$ halohydrocarbyloxy wherein at least two carbon atoms separate the halogen and oxygen atoms, or the like; X may be hydrogen, $C_1$–$C_{18}$ hydrocarbyl, or $C_1$–$C_{18}$ hydrocarbyl containing a substituent such as carboxylic acid, aldehyde, alcohol, amino radicals, or the like; X also may be sulfur, sulfonyl, sulfinyl, oxygen, or other such bridging group having a valence of 2 or greater to result in various bis- or higher polyphenols; n (i.e., the number of phenylene ether units bound to X) is 1 to about 100, preferably 1 to 3, and more preferably 1 to 2. Q may be the residuum of a monohydric phenol, such as 2,6-dimethylphenol, in which case n is 1. Q may also be the residuum of a diphenol, such as 2,2',6,6'-tetramethyl-4,4'-diphenol, in which case n is 2.

In one embodiment, the capped poly(arylene ether) is produced by capping a poly(arylene ether) consisting essentially of the polymerization product of at least one monohydric phenol having the structure

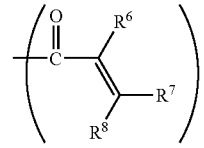

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_2$–$C_{12}$ halohydrocarbyloxy wherein at least two carbon atoms separate the halogen and oxygen atoms, or the like; and $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_2$–$C_{12}$ halohydrocarbyloxy wherein at least two carbon atoms separate the halogen and oxygen atoms, or the like. Suitable monohydric phenols include those described, for example, in U.S. Pat. No. 3,306,875 to Hay, and highly preferred monohydric phenols include 2,6-dimethylphenol and 2,3,6-trimethylphenol. The poly (arylene ether) may be a copolymer of at least two monohydric phenols, such as 2,6-dimethylphenol and 2,3,6-trimethylphenol. In one embodiment, the monohydric phenol is 2,6-dimethylphenol having a purity of greater than about 99 weight percent, preferably greater than about 99.6 weight percent, and more preferably greater than about 99.8 weight percent. The 2,6-dimethylphenol preferably comprises less than about 1000 parts per million by weight of water and more preferably less than about 500 parts per million by weight of water. It is believed that minimizing the amount of water in the 2,6-dimethylphenol monomer may improve the oxidative polymerization process, as water is a product of the reaction.

In one embodiment, the capped poly(arylene ether) comprises at least one capping group having the structure

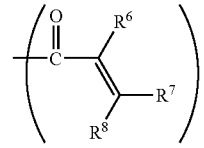

wherein $R^6$–$R^8$ are each independently hydrogen, $C_1$–$C_{18}$ hydrocarbyl optionally substituted with one or two carboxylic acid groups, $C_2$–$C_{18}$ hydrocarbyloxycarbonyl, nitrile, formyl, carboxylic acid, imidate, thiocarboxylic acid, or the like. Highly preferred capping groups include acrylate ($R^6$=$R^7$=$R^8$=hydrogen) and methacrylate ($R^6$=methyl, $R^7$=$R^8$=hydrogen). It will be understood that the term "(meth)acrylate" means either acrylate or methacrylate.

In another embodiment, the capped poly(arylene ether) comprises at least one capping group having the structure

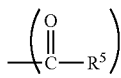

wherein $R^5$ is $C_1$–$C_{12}$ hydrocarbyl optionally substituted with one or two carboxylic acid groups, preferably $C_1$–$C_{12}$ alkyl, more preferably methyl, ethyl, or isopropyl. The advantageous properties of the invention can be achieved even when the capped poly(arylene ether) lacks a polymerizable function such as a carbon-carbon double bond.

In yet another embodiment, the capped poly(arylene ether) comprises at least one capping group having the structure

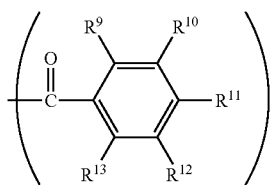

wherein $R^9$–$R^{13}$ are each independently hydrogen, halogen, $C_1$–$C_{12}$ alkyl, hydroxy, amino, carboxylic acid, or the like. Preferred capping groups of this type include salicylate ($R^9$=hydroxy, $R^{10}$–$R^{13}$=hydrogen).

In still another embodiment, the capped poly(arylene ether) comprises at least one capping group having the structure

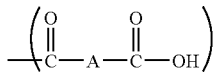

wherein A is a saturated or unsaturated $C_2$–$C_{12}$ divalent hydrocarbon group such as, for example, ethylene, 1,2-propylene, 1,3-propylene, 2-methyl- 1,3-propylene, 2,2-dimethyl-1,3-propylene, 1,2-butylene, 1,3-butylene, 1,4-butylene, 2-methyl- 1,4-butylene, 2,2-dimethyl-1,4-butylene, 2,3-dimethyl- 1,4-butylene, vinylene (—CH=CH—), 1,2-phenylene, and the like. These capped poly(arylene ether) resins may conveniently be prepared, for example, by reaction of an uncapped poly(arylene ether) with a cyclic anhydride capping agent. Such cyclic anhydride capping agents include, for example, maleic anhydride, succinic anhydride, glutaric anhydride, adipic anhydride, phthalic anhydride, and the like.

There is no particular limitation on the method by which the capped poly(arylene ether) is prepared. The capped poly(arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate,, ester, isocyanate, cyanate ester, or alkyl halide radicals. Phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-α,α-dimethylphenylisocyanate, cyanatobenzene, 2,2-bis(4-cyanatophenyl)propane, 3-α-chloromethyl) styrene, 4-(α-chloromethyl)styrene, allyl bromide, and the like, and substituted derivatives thereof, and mixtures thereof. These and other methods of forming capped poly (arylene ether)s are described, for example, in U.S. Pat. Nos. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. No. 5,071,922, 5,079,268, 5,304,600, and 5,310,820 to Nelissen et al.; U.S. Pat. No. 5,338,796 to Vianello et al.; U.S. patent application Publication No. 2001/0053820 A1 to Yeager et al.; and European Patent No. 261,574 B1 to Peters et al.

A capping catalyst may be employed in the reaction of an uncapped poly(arylene ether) with an anhydride. Examples of such compounds include those known to the art that are capable of catalyzing condensation of phenols with the capping agents described above. Useful materials include, but are not limited to, basic compounds including, for example, basic compound hydroxide salts such as sodium hydroxide, potassium hydroxide, tetraalkylammonium hydroxides, and the like; tertiary alkylamines such as tributylamine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-dimethylaminopyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The functionalized poly(arylene ether) may be a ring-functionalized poly(arylene ether). In one embodiment, the ring-functionalized poly(arylene ether) is a poly(arylene ether) comprising repeating structural units of the formula

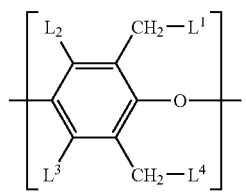

wherein each $L^1$–$L^4$ is independently hydrogen, a $C_1$–$C_{12}$ alkyl group, an alkenyl group, or an alkynyl group; wherein the alkenyl group is represented by

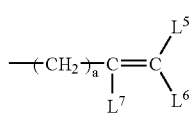

wherein $L^5$–$L^7$ are independently hydrogen or methyl, and a is 0, 1, 2, 3, or 4; wherein the alkynyl group is represented by

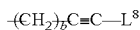

wherein $L^8$ is hydrogen, methyl, or ethyl, and b is 0, 1, 2, 3, or 4; and wherein about 0.02 mole percent to about 25 mole percent of the total $L^1$–$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups.

The ring-functionalized poly(arylene ether) may be prepared according to known methods. For example, an unfunctionalized poly(arylene ether) such as poly(2,6-dimethyl-1,4-phenylene ether) may be metallized with a reagent such as n-butyl lithium and subsequently reacted with an alkenyl halide such as allyl bromide and/or an alkynyl halide such as propargyl bromide. This and other methods for preparation of ring-functionalized poly(arylene ether) resins are described, for example, in U.S. Pat. No. 4,923,932 to Katayose et al.

In another embodiment, the functionalized poly(arylene ether) is the product of the melt reaction of a poly(arylene ether) and an α,β-unsaturated carbonyl compound or a β-hydroxy carbonyl compound to produce an acid- or anhydride-functionalized poly(arylene ether). In some embodiments both acid and anhydride functionality may be present. Examples of α,β-unsaturated carbonyl compounds include, for example, fumaric acid, maleic acid, maleic anhydride, itaconic acid, itaconic anhydride, citraconic acid, citraconic anhydride, as well as various derivatives of the foregoing and similar compounds. Examples of β-hydroxy carbonyl compounds include, for example, citric acid, malic acid, and the like. Such functionalization is typically carried out by melt mixing the poly(arylene ether) with the desired carbonyl compound at a temperature of about 190 to about 290° C.

There is no particular limitation on the molecular weight or intrinsic viscosity of the functionalized poly(arylene ether). In one embodiment, the composition may comprise a functionalized poly(arylene ether) having a number average molecular weight of about 1,000 to about 25,000 atomic mass units (AMU). Within this range, it may be preferable to use a functionalized poly(arylene ether) having a number average molecular weight of at least about 2,000 AMU, more preferably at least about 4,000 AMU. In another embodiment, the composition may comprise a functionalized poly(arylene ether) having an intrinsic viscosity of about 0.05 to about 0.6 deciliters per gram (dL/g) as measured in chloroform at 25° C. Within this range, the functionalized poly(arylene ether) intrinsic viscosity may preferably be at least about 0.08 dL/g, more preferably at least about 0.1 dL/g. Also within this range, the functionalized poly(arylene ether) intrinsic viscosity may preferably be up to about 0.5 dL/g, still more preferably up to about 0.4 dL/g. Generally, the intrinsic viscosity of a functionalized poly(arylene ether) will vary insignificantly from the intrinsic viscosity of the corresponding unfunctionalized poly(arylene ether). Specifically, the intrinsic viscosity of a functionalized poly(arylene ether) will generally be within 10% of that of the unfunctionalized poly(arylene ether). It is expressly contemplated to employ blends of at least two functionalized poly(arylene ether)s having different molecular weights and intrinsic viscosities. The composition may comprise a blend of at least two functionalized poly(arylene ethers). Such blends may be prepared from individually prepared and isolated functionalized poly(arylene ethers). Alternatively, such blends may be prepared by reacting a single poly(arylene ether) with at least two functionalizing agents. For example, a poly(arylene ether) may be reacted with two capping agents, or a poly(arylene ether) may be metallized and reacted with two unsaturated alkylating agents. In another alternative, a mixture of at least two poly(arylene ether) resins having different monomer compositions and/or molecular weights may be reacted with a single functionalizing agent. The composition may, optionally, comprise a blend of a functionalized poly(arylene ether) resin and an unfunctionalized poly(arylene ether) resin, and these two components may, optionally, have different intrinsic viscosities.

The curable composition may comprise about 5 to about 90 parts by weight of the functionalized poly(arylene ether) per 100 parts by weight total of the functionalized poly(arylene ether) and the olefinically unsaturated monomer. Within this range, the amount of the functionalized poly(arylene ether) resin may preferably be at least about 10 parts by weight, more preferably at least about 15 parts by weight. Also within this range, the amount of the functionalized poly(arylene ether) resin may preferably be up to about 80 parts by weight, more preferably up to about 60 parts by weight, still more preferably up to about 50 parts by weight.

The composition comprises an olefinically unsaturated monomer. The olefinically unsaturated monomer is herein defined as a polymerizable monomer comprising a carbon-carbon double bond. Suitable olefinically unsaturated monomers include, for example, alkenyl aromatic monomers, allylic monomers, acryloyl monomers, and the like, and mixtures thereof.

The alkenyl aromatic monomer may have the formula

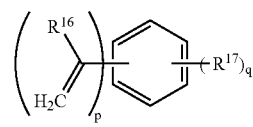

wherein each occurrence of $R^{16}$ is independently hydrogen or $C_1$–$C_{18}$ hydrocarbyl; each occurrence of $R^{17}$ is independently halogen, $C_1$–$C_{12}$ alkyl, $C_1$–$C_{12}$ alkoxyl, or $C_6$–$C_{18}$ aryl; p is 1 to 4; and q is 0 to 5. Unspecified positions on the aromatic ring are substituted with hydrogen atoms. Suitable alkenyl aromatic monomers include, for example, styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and the like, and combinations thereof. Styrene is a particularly preferred alkenyl aromatic monomer.

The olefinically unsaturated monomer may be an allylic monomer. An allylic monomer is an organic compound comprising at least one, preferably at least two, more preferably at least three allyl (—$CH_2$—CH=$CH_2$) groups. Suitable allylic monomers include, for example, diallyl phthalate, diallyl isophthalate, triallyl mellitate, triallyl mesate, triallyl benzenes, triallyl cyanurate, triallyl isocyanurate, mixtures thereof, partial polymerization products prepared therefrom, and the like.

In a preferred embodiment, the olefinically unsaturated monomer may be an acryloyl monomer. An acryloyl monomer is a compound comprising at least one acryloyl moiety having the structure

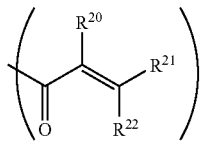

wherein $R^{20}$–$R^{22}$ are each independently hydrogen, $C_1$–$C_{12}$ hydrocarbyl, $C_2$–$C_{18}$ hydrocarbyloxycarbonyl, nitrile, formyl, carboxylic acid, imidate, thiocarboxylic acid, or the like. In one embodiment, the acryloyl monomer comprises at least two acryloyl moieties. In another embodiment, the acryloyl monomer comprises at least three acryloyl moieties. Suitable acryloyl monomers include, for example, trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl (meth)acrylate, methacryloxypropyl trimethoxysilane (also known as 3-(trimethoxysilyl)propyl methacrylate), ethoxylated (2) bisphenol A di(meth)acrylate (it will be understood that the number following the ethoxylated term refers to the average number of ethoxy groups in the ethoxylate chain attached to each oxygen of bisphenol A; where an acryloyl monomer is described as "ethoxylated" but no number is specified, any number of ethoxylate groups may be present), and the like, and mixtures comprising at least one of the foregoing acryloyl monomers.

The composition may generally comprise about 10 to about 95 parts by weight of the olefinically unsaturated monomer per 100 parts by weight total of the capped poly(arylene ether) and the olefinically unsaturated monomer. Within this range, it may be preferable to use an olefinically unsaturated monomer amount of at least about 20 parts by weight, more preferably at least about 30 parts by weight. Also within this range, it may be preferable to use an olefinically unsaturated monomer amount of up to about 80 parts per weight, more preferably up to about 60 parts by weight.

The composition comprises about 0.2 to about 5 parts by weight of a curing initiator per 100 parts by weight total of the functionalized poly(arylene ether) and the olefinically unsaturated monomer. Within this range, the curing initiator amount is preferably at least about 0.5 part by weight, more preferably at least about 1 part by weight, still more preferably at least about 1.5 parts by weight. Also within this range, the curing initiator amount is preferably up to about 4 parts by weight, more preferably up to about 3 parts by weight. In one embodiment, the curing initiator amount may be expressed in units of micromoles per gram of resin, where "resin" consists of the functionalized poly(arylene ether) and the olefinically unsaturated monomer. In this embodiment, the curing initiator amount is preferably at least about 100 micromoles per gram of resin.

Curing initiators, also referred to as curing catalysts, are well known in the art and may be used to initiate the polymerization, curing, or crosslinking of numerous thermoplastics and thermosets including unsaturated polyester, vinyl ester and allylic thermosets. Non-limiting examples of curing initiators include those described in U.S. Pat. Nos. 5,407,972 to Smith et al., and U.S. Pat. No. 5,218,030 to Katayose et al. The curing initiator may include any compound capable of producing free radicals at elevated temperatures. Such curing initiators may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy)isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures comprising at least one of the foregoing curing initiators. Suitable non-peroxy curing initiators include, for example, 2,3-dimethyl-2,3-diphenylbutane, 2,3-trimethylsilyloxy-2,3-diphenylbutane, and the like, and mixtures comprising at least one of the foregoing curing initiators. The curing initiator for the unsaturated portion of the thermoset may further include any compound capable of initiating anionic polymerization of the unsaturated components. Such anionic polymerization initiators include, for example, alkali metal amides, such as sodium amide ($NaNH_2$) and lithium diethyl amide ($LiN(C_2H_5)_2$); alkali metal and ammonium salts of $C_1$–$C_{10}$ alkoxides; alkali metal and ammonium hydroxides; alkali metal cyanides; organometallic compounds such as the alkyl lithium compound n-butyl lithium; Grignard reagents such as phenyl magnesium bromide; and the like; and combinations comprising at least one of the foregoing anionic polymerization initiators. In a preferred embodiment, the curing initiator may comprise t-butylperoxy benzoate or dicumyl peroxide. The curing initiator may promote curing at a temperature in a range of about 0° C. to about 200° C.

The composition comprises about 0.005 to about 1 part by weight of a curing inhibitor per 100 parts by weight total of the functionalized poly(arylene ether) and the olefinically unsaturated monomer. Within this range, the curing inhibitor amount may preferably be at least about 0.05 part by weight, more preferably at least about 0.1 part by weight. Also within this range, the curing inhibitor amount may preferably be up to about 0.5 part by weight, more preferably up to about 0.3 part by weight. In one embodiment, the curing inhibitor amount may be expressed in units of micromoles per gram of resin, where "resin" consists of the functionalized poly(arylene ether) and the olefinically unsaturated monomer. In this embodiment, the curing inhibitor amount is preferably at least about 50 micromoles per gram of resin.

Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$–$C_6$-alkyl-substituted catechols, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and the like, and combinations comprising at least one of the foregoing curing inhibitors. Suitable curing inhibitors further include uncapped poly(arylene ether)s (i.e., poly(arylene ether)s having free hydroxyl groups). With reference to the capped poly(arylene ether) structure $Q(J-K)_y$, above, the uncapped poly(arylene ether) may have the structure $Q(J-H)_y$, wherein each capping group K is replaced by a hydrogen atom, H. Preferred curing inhibitors include benzoquinone, hydroquinone, and 4-t-butylcatechol.

The weight ratio of the curing initiator to the curing inhibitor is about 1.2:1 to about 50:1. Within this range, the weight ratio is preferably at least about 2:1, more preferably at least about 5:1. Also within this range, the weight ratio is preferably up to about 20:1, more preferably up to about 12:1. The optimum weight ratio will depend on factors including the desired property balance, the identity of the curing initiator, the identity of the curing inhibitor, the type and amount of the functionalized poly(arylene ether), the type and amount of the olefinically unsaturated monomer, and the types and amounts of optional components. In one embodiment, the relative amounts of the curing initiator and the curing inhibitor may be specified as a molar ratio. In this embodiment, the molar ratio of the curing initiator to the curing inhibitor may be about 20:1 to about 1:1. Within this range, the molar ratio may preferably be at least about 2:1. Also within this range, the molar ratio may preferably be up to about 10:1, more preferably up to about 5:1.

The composition may, optionally, further comprise one or more fillers, including particulate fillers and fibrous fillers. Examples of such fillers are well known in the art and include those described in "Plastic Additives Handbook, 4$^{th}$ Edition" R. Gachter and H. Muller (eds.), P. P. Klemchuck (assoc. ed.) Hanser Publishers, New York 1993, pages 901–948. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having high thermal conductivity, low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (in its anhydrous, hemihydrated, dihydrated, or trihydrated forms), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, nodular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilane or acryloyl-silane coatings to impart good physical properties to compounded blends; feldspar and nepheline syenite; silicate spheres; flue dust; cenospheres; fillite; aluminosilicate (armospheres), including silanized and metallized aluminosilicate; natural silica sand; quartz; quartzite; perlite; Tripoli; diatomaceous earth; synthetic silica, including those with various silane coatings, and the like.

Preferred particulate fillers include fused silica having an average particle size of about 1 to about 50 micrometers. A particularly preferred particulate filler comprises a first fused silica having a median particle size of about 0.03 micrometer to less than 1 micrometer, and a second fused silica having a median particle size of at least 1 micrometer to about 30 micrometers. The preferred fused silicas have essentially spherical particles, typically achieved by re-melting. Within the size range specified above, the first fused silica may preferably have a median particle size of at least about 0.1 micrometer, preferably at least about 0.2 micrometer. Also within the size range above, the first fused silica may preferably have a median particle size of up to about 0.9 micrometer, more preferably up to about 0.8 micrometer. Within the size range specified above, the second fused silica may preferably have a median particle size of at least about 2 micrometers, preferably at least about 4 micrometers. Also within the size range above, the second fused silica may preferably have a median particle size of up to about 25 micrometers, more preferably up to about 20 micrometers. In one embodiment, the composition comprises the first fused silica and the second fused silica in a weight ratio in a range of about 70:30 to about 99:1, preferably in a range of about 80:20 to about 95:5.

Fibrous fillers include short inorganic fibers, including processed mineral fibers such as those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, carbon, iron, nickel, copper. Also included among fibrous fillers are glass fibers, including textile glass fibers such as E, A, C, ECR, R, S, D, and NE glasses and quartz. Preferred fibrous fillers include glass fibers having a diameter in a range of about 5 to about 25 micrometers and a length before compounding in a range of about 0.5 to about 4 centimeters. Many other suitable fillers are described in U.S. patent application Publication No. 2001/0053820 A1 to Yeager et al.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1–3, R is an alkyl or aryl group and Y is a reactive functional group which can enable formation of a bond with a polymer molecule. Particularly useful examples of coupling agents are those having the structure $(RO)_3SiY$. Typical examples include vinyl triethoxysilane, vinyl tris(2-methoxy)silane, phenyl trimethoxysilane, γ-methacryloxypropyltrimethoxy silane, γ-aminopropyltriethoxysilane, γ-glycidoxypropyltrimethoxysilane, γ-mercaptopropyltrimethoxysilane, and the like. Silanes further include molecules lacking a reactive functional group, such as, for example, trimethoxyphenylsilane. Titanates include those developed by S. J. Monte et al. in Ann. Chem. Tech Conf. SPI (1980), Ann. Tech Conf. Reinforced Plastics and Composite Inst. SPI 1979, Section 16E, New Orleans; and S. J. Monte, Mod. Plastics Int., volume 14, number 6, pg. 2 (1984). Zirco-aluminates include those described by L. B. Cohen in Plastics Engineering, volume 39, number 11, page 29 (1983). The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

When present, the particulate filler may be used in an amount of about 5 to about 95 weight percent, based on the total weight of the composition. Within this range, it may be preferable to use a particulate filler amount of at least about 20 weight percent, more preferably at least about 40 weight percent, even more preferably at least about 75 weight percent. Also within this range, it may be preferable to use a particulate filler amount of up to about 93 weight percent, more preferably up to about 91 weight percent.

When present, the fibrous filler may be used in an amount of about 2 to about 80 weight percent, based on the total weight of the composition. Within this range, it may be preferred to use a fibrous filler amount of at least about 5 weight percent, more preferably at least about 10 weight percent, yet more preferably at least about 15 weight percent. Also within this range, it may be preferred to use a fibrous filler amount of up to about 60 weight percent, more preferably up to about 40 weight percent, still more preferably up to about 30 weight percent.

The aforementioned fillers may be added to the thermosetting resin without any treatment, or after surface treatment, generally with an adhesion promoter.

The curable composition may, optionally, further comprise one or more additives known in the art, such as, for example, dyes, pigments, colorants, antioxidants, heat stabilizers, light stabilizers, plasticizers, lubricants, flow modifiers, drip retardants, antiblocking agents, antistatic agents, flow-promoting agents, processing aids, substrate adhesion agents, mold release agents, toughening agents, low-profile additives, stress-relief additives, flame retardants, and the like, and combinations thereof. Those skilled in the art may select suitable additives and determine suitable amounts without undue experimentation.

In one embodiment, the curable composition comprises a functionalized poly(arylene ether) comprising a (meth)acrylate-capped poly(2,6-dimethyl-1,4-phenylene ether) resin, a (meth)acrylate-capped poly(2,6-dimethyl-1,4-phenylene ether-co-2,3,6-trimethyl-1,4-phenylene ether) resin, or a mixture thereof; an acryloyl monomer comprising at least two acryloyl moieties; a particulate filler; about 0.2 to about 5 parts by weight of a curing initiator per 100 parts by weight total of the functionalized poly(arylene ether) and the olefinically unsaturated monomer; wherein the curing initiator is selected from benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and mixtures thereof; and about 0.005 to about 1 part by weight of a curing inhibitor per 100 parts by weight total of the functionalized poly(arylene ether) and the olefinically unsaturated monomer; wherein the curing inhibitor is selected from diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$–$C_6$-alkyl-substituted catechols, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and mixtures thereof; wherein the weight ratio of the curing initiator to the curing inhibitor is about 1.2:1 to about 50:1.

In another embodiment, the curable composition comprises about 5 to about 90 parts by weight of a methacrylate-capped poly(2,6-dimethyl-1,4-phenylene ether); about 10 to about 95 parts by weight of an ethoxylated bisphenol A dimethacrylate; about 200 to about 2000 parts by weight of fused silica; about 0.2 to about 5 parts by weight of dicumyl peroxide; and about 0.005 to about 1 part by weight of 4-t-butylcatechol; wherein all parts by weight are based on 100 parts by weight total of the methacrylate-capped poly(2,6-dimethyl-1,4-phenylene ether) and the ethoxylated bisphenol A dimethacrylate; and wherein the weight ratio of the curing initiator to the curing inhibitor is about 2:1 to about 20:1.

There is no particular limitation on the method by which the composition is prepared, as long as it does not interfere with the ability of the cured composition to exhibit the desired property balance. The composition may be prepared by forming an intimate blend comprising the functionalized poly(arylene ether), the olefinically unsaturated monomer, the curing initiator, and the curing inhibitor. For example, one embodiment is a method of forming a curable composition, comprising forming an intimate blend by a procedure comprising blending a functionalized poly(arylene ether); an olefinically unsaturated monomer; about 0.2 to about 5 part by weight of a curing initiator per 100 parts by weight total of the functionalized poly(arylene ether) and the olefinically unsaturated monomer; and about 0.005 to about 1 part by weight of a curing inhibitor per 100 parts by weight total of the functionalized poly(arylene ether) and the olefinically unsaturated monomer; wherein the weight ratio of the curing initiator to the curing inhibitor is about 1.2:1 to about 50:1. When the composition comprises a capped poly(arylene ether), it may be prepared from an uncapped poly(arylene ether) by a procedure that includes dissolving the uncapped poly(arylene ether) in a portion of the olefinically unsaturated monomer, adding a capping agent to form the capped poly(arylene ether) in the presence of the olefinically unsaturated monomer, adding the curing initiator and curing inhibitor, and adding any other optional components to form the curable composition.

There is no particular limitation on the method by which the composition may be cured. The composition may, for example, be cured thermally or by using irradiation techniques, including radio frequency heating, UV irradiation and electron beam irradiation. For example, the composition may be cured by initiating chain-reaction curing with 10 seconds of radio frequency heating. When heat curing is used, the temperature selected may be in a range of about 80° to about 300° C. The heating period may be in a range of about 5 seconds to about 24 hours. Curing may be staged to produce a partially cured and often tack-free resin, which then is fully cured by heating for longer periods or at higher temperatures.

One embodiment is a cured composition obtained by curing any of the above-described curable compositions. It will be understood that the term "curing" includes partially curing and fully curing. Because the components of the curable composition may react with each other during curing, the cured compositions may be described as comprising the reaction products of the curable composition components.

Another embodiment is an article comprising any of the cured compositions. The curable composition is useful for fabricating a wide range of articles, and it is particularly suitable for use as an encapsulant for electronic devices. The encapsulant portion of such electronic devices may be prepared using techniques known in the art such as, for example, transfer molding. The composition exhibits highly desirable properties. For example, the curable composition may exhibit a spiral flow of at least about 70 centimeters, preferably at least about 80 centimeters, more preferably at least about 90 centimeters, even more preferably at least about 100 centimeters, measured at a temperature in the range of about 140 to about 180° C. and a pressure in the range of about 3 to about 7 megapascals according to the procedure described below. As another example, the curable composition may exhibit a Shore D hardness at the molding temperature of at least 70, preferably at least 80, more preferably at least 90, after curing for 120 seconds at a molding temperature in the range of about 140 to about 180° C. The Shore D hardness values just mentioned may preferably be achieved in about 110 seconds, more preferably about 100 seconds, still more preferably about 90 seconds. Shore D hardness may be measured according to ISO 868. As another example, the curable composition may exhibit a d(log ion viscosity)/d(time) value of unity, measured by dielectric cure monitoring, after curing at 160° C. for a time in the range of about 50 to about 160 seconds, wherein log ion viscosity is expressed in ohm-centimeters and time is expressed in minutes. The d(log ion viscosity)/d(time) value of unity may preferably be achieved in a time in the range of about 60 to about 150 seconds. Values of d(log ion viscosity)/d(time) may be measured with instruments commercially available from various suppliers, such as, for example, the ICAM-1500 Cure Analyzer available from Holometric Micromet.

The invention is further illustrated by the following non-limiting examples.

EXAMPLES 1 AND 2,

COMPARATIVE EXAMPLES 1–4

Three experimental formulations varying in inhibitor concentration were prepared and tested. Also tested were three commercially available epoxy thermoset resins. Comparative Example 2 was an epoxy thermoset resin obtained as CEL-410 from Hitachi Chemical, having a recommended molding temperature of 175–185° C. and a recommended molding time of 90–120 seconds. Comparative Example 3 was an epoxy thermoset resin obtained as CEL-9500 from Hitachi Chemical, having a recommended molding temperature of 175–185° C. and a recommended molding time of 90–120 seconds. Comparative Example 4 was an epoxy thermoset resin obtained as HYSOLO MG40F-2000 from Henkel Loctite Chemical, having a recommended molding temperature of 165–180° C. and a recommended molding time of 70–100 seconds. Each of the experimental formulations contained 65.2 parts by weight of a fused silica obtained from Denka as FB-74 having an average particle size of 30.4 micrometers and a surface area of 1.6 meter$^2$/gram; 16.30 parts by weight of a fused silica obtained from Denka as FS-20 having an average particle size of 5.0 micrometers and a surface area of 6.7 meter$^2$/gram; 3.0 parts by weight of a methacrylate-capped poly(2,6-dimethyl-1,4-phenylene ether) having an intrinsic viscosity of 0.30 dL/g at 25° C. in chloroform; 0.40 parts by weight of a partially saponified ester of montanic acid obtained as LICOWAX® OP from Clariant; 3.30 parts by weight of a 10 weight percent solution of dicumyl peroxide in hexanediol diacrylate (hexanediol diacrylate was obtained as SR238 from Sartomer); 3.0 parts by weight of trimethylolpropane trimethacrylate obtained as SR350 from Sartomer; and 0.50 parts by weight of 3-methacryloxypropyltrimethoxysilane obtained as Z-6030 from Dow Corning. To this mixture was added 0 (Comparative Example 1), 0.34 (Comparative Example 2), or 0.68 (Example 1) parts by weight of a 10 weight percent solution of 4-t-butylcatechol in hexanediol diacrylate to yield 4-t-butylcatechol amounts of 0, 0.034, and 0.068 parts by weight, respectively. Also added was an amount of additional hexanediol diacrylate so that the total of the additional hexanediol diacrylate and the hexanediol diacrylate in any 4-t-butyl catechol solution was 6.03 parts by weight. The experimental formulations therefore each had 15.50 parts by weight total of functionalized poly(arylene ether) and olefinically unsaturated monomer, and 0.33 parts by weight of initiator, corresponding to 2.13 parts by weight initiator per 100 parts by weight total of functionalized poly(arylene ether) and olefinically unsaturated monomer. Comparative Example 1 had no inhibitor. Example 1 had 0.034 parts by weight inhibitor, corresponding to 0.219 parts by weight inhibitor per 100 parts by weight total of functionalized poly(arylene ether) and olefinically unsaturated monomer, and an initiator:inhibitor weight ratio of 9.70:1. Example 2 had 0.068 parts by weight inhibitor, corresponding to 0.439 parts by weight inhibitor per 100 parts by weight total of functionalized poly(arylene ether) and olefinically unsaturated monomer, and an initiator:inhibitor weight ratio of 4.85:1.

Curing rates were studied by dielectric cure monitoring using an ICAM-1500 Cure Analyzer obtained from Holometric Micromet. Log(ion viscosity) was monitored as a function of time at constant cure temperature of 160° C. Responses obtained in this study included the critical points "CP2," "CP3," and "CP4." CP2 corresponds to the time at which ion viscosity reaches a minimum. CP3 corresponds to the time of maximum cure rate (i.e., maximum slope, d(log ion viscosity)/d(time)). CP4 corresponds to the time at which the slope, d(log ion viscosity, in ohm-cm)/d(time, in minutes), is unity and approximates the endpoint of curing.

Curing data are summarized in Table 1. Concentrations of 4-t-butylcatechol and dicumyl peroxide are expressed in parts per hundred weight resin (phr), which is equivalent to parts by weight per 100 parts by weight total of functionalized poly(arylene ether) and olefinically unsaturated monomer. The data show that Examples 1 and 2 exhibit a good balance between time to maximum curing rate and time to approach completion of the cure. In contrast, Comparative Example 1 cures too quickly to allow good flow in the mold.

TABLE 1

|  | C. Ex. 1 | Ex. 1 | Ex. 2 |
|---|---|---|---|
| t-Butylcatechol (phr) | 0 | 0.219 | 0.349 |
| Dicumyl peroxide (phr) | 2.13 | 2.13 | 2.13 |
| Dicumyl peroxide:t-butylcatechol | — | 9.70 | 4.85 |
| Time to minimum d(log ion viscosity)/dt (sec) | 11.64 at 147° C. | 33.79 at 146° C. | 42.84 at 146° C. |
|  | 12.58 at 146° C. | 33.25 at 147° C. | 42.78 at 147° C. |
|  | 6.59 at 157° C. | 18.28 at 155° C. | 21.70 at 157° C. |
|  | 8.03 at 154° C. | 18.38 at 156° C. | 20.64 at 156° C. |
|  | 4.55 at 165° C. | 10.84 at 165° C. | 14.12 at 164° C. |
|  | 5.05 at 163° C. |  | 12.63 at 163° C. |
| Time to maximum d(log ion viscosity)/dt (sec) | 28.32 at 147° C. | 69.03 at 146° C. | 86.89 at 146° C. |
|  | 29.74 at 146° C. | 66.42 at 147° C. | 87.86 at 147° C. |
|  | 20.72 at 157° C. | 37.91 at 155° C. | 44.63 at 157° C. |
|  | 22.63 at 154° C. | 37.25 at 156° C. | 44.34 at 156° C. |
|  | 18.16 at 165° C. | 24.21 at 165° C. | 31.20 at 164° C. |
|  | 18.63 at 163° C. |  | 29.72 at 163° C. |
| Time to unity d(log ion viscosity)/dt (sec) | 44.91 at 147° C. | 100.25 at 146° C. | 122.63 at 146° C. |
|  | 48.33 at 146° C. | 93.63 at 147° C. | 121.33 at 147° C. |
|  | 36.28 at 157° C. | 57.25 at 155° C. | 70.05 at 157° C. |
|  | 39.75 at 154° C. | 56.89 at 156° C. | 84.06 at 156° C. |
|  | 31.73 at 165° C. | 43.33 at 165° C. | 52.41 at 164° C. |
|  | 32.72 at 163° C. |  | 41.41 at 163° C. |

|  | C. Ex. 2 | C. Ex. 3 | C. Ex. 4 |
|---|---|---|---|
| t-Butylcatechol (phr) | — | — | — |
| Dicumyl peroxide (phr) | — | — | — |
| Dicumyl peroxide:t-butylcatechol | — | — | — |
| Time to minimum d(log ion viscosity)/dt (sec) | 10.11 at 167° C. | 14.63 at 166° C. | 15.68 at 165° C. |
|  | 8.06 at 168° C. | 13.67 at 167° C. | 12.11 at 167° C. |
| Time to maximum d(log ion viscosity)/dt (sec) | 54.48 at 167° C. | 47.64 at 166° C. | 46.17 at 165° C. |
|  | 53.94 at 168° C. | 42.00 at 167° C. | 46.72 at 167° C. |
| Time to unity d(log ion viscosity)/dt (sec) | 116.00 at 167° C. | 104.00 at 166° C. | 115.61 at 165° C. |
|  | 112.77 at 168° C. | 102.58 at 167° C. | 109.03 at 167° C. |

EXAMPLE 3, COMPARATIVE EXAMPLES 5–7

Four formulations were prepared, varying in the amount of the methacrylate-capped polyphenylene ether, the amount of diallyl phthalate monomer, the amount of trimethylolpropane trimethacrylate monomer, and the presence or absence of montanic acid, and esterified montanic acid. A methacrylate-capped poly(2,6-dimethyl-1,4-phenylene ether) resin having an intrinsic viscosity of 0.12 dL/g is abbreviated as MA-PPE (0.12) in Table 2. Diallyl phthalate was obtained as product number 24648 from Avocado Research Chemicals. Partially saponified montanic acid ester (also known as partially esterified montanic acid) was obtained as LICO-WAX® OP from Clariant. A carbon black pigment was obtained as PRINTEX® XE 2 from Degussa. The silane coupling agent methacryloxypropyl trimethoxysilane was obtained as Z-6030 from Dow Corning. Fused silica was an 80/20 weight/weight mixture of FB74 (spherical; mean particle size of 31.5 micrometers) and FS20 (irregular; mean particle size of 5.6 micrometers), both obtained from Denka.

Spiral flow lengths were measured at 150° C. and 5.5 megapascals transfer pressure on 15 gram samples of molding powder with no preheating. A transfer pot and EMMI spiral flow tool were used. The spiral flow measurements were performed according to the standard procedure "SEMI G11-88. Recommended Practice for Ram Follower Gel Time and Spiral Flow of Thermal Setting Molding Compounds", published by Semiconductor Equipment and Materials International. Compositions and results are summarized in Table 2. All component amounts are in units of parts by weight. The results show that spiral flow is low even in the absence of a peroxide initiator (see C. Ex. 9), and that the best (highest) spiral flow was observed for the Example 3 sample with initiator and inhibitor concentrations according to the invention.

TABLE 2

|  | C. Ex. 5 | C. Ex. 6 | C. Ex. 7 | Ex. 3 |
|---|---|---|---|---|
| MA-PPE (0.12) | 8.99 | 8.99 | 8.99 | 8.94 |
| Diallyl phthalate | 8.89 | 9.07 | 9.27 | 8.89 |
| Trimethylolpropane trimethacrylate | 3.2 | 3.28 | 3.34 | 3.2 |
| Dicumyl peroxide | 0.52 | 0.26 | — | 0.52 |
| t-Butyl catechol | — | — | — | 0.05 |
| Esterified Montanic Acid | 0.2 | 0.2 | 0.2 | 0.2 |
| Montanic acid | 0.2 | 0.2 | 0.2 | 0.2 |
| Dibromostyrene | 1 | 1 | 1 | 1 |
| Antimony pentoxide | 1.3 | 1.3 | 1.3 | 1.3 |
| Carbon black | 0.2 | 0.2 | 0.2 | 0.2 |
| Silane coupling agent | 0.5 | 0.5 | 0.5 | 0.5 |
| Fused silica | 75 | 75 | 75 | 75 |
| Mold Temperature(s) (° C.) | 150 | 150.5 | 150.7 | 150.2 |
| Spiral Flow (cm) | 12.7 | 10.2 | 17.1 | 30.5 |

EXAMPLES 4–12

Nine samples varying in concentrations of acryloyl monomer, functionalized poly(arylene ether), curing initiator, and curing inhibitor were prepared and tested. The acryloyl monomer was ethoxylated (2) bisphenol A dimethacrylate, obtained as SR-348 from Sartomer. The acryloyl monomer nominally contained 340 parts per million by weight of hydroquinone mono methyl ether. The functionalized poly (arylene ether) was a methacrylate-capped poly(2,6-dimethyl-1,4-phenylene ether) having an intrinsic viscosity of 0.3 dL/g. The initiator was dicumyl peroxide obtained as LUPEROX® 505R from Elf Atochem. Additional inhibitor was added as 4-t-butyl catechol. Component amounts are given in Table 3. Amounts are expressed in parts per hundred weight resin (pph), where resin consists of the capped polyphenylene ether and the acryloyl monomer. Amounts of initiator and inhibitor are also expressed as moles per gram (mol/g) of the total composition.

Total heats generated during 90 seconds and 10 minutes of curing at 147 and 157° C., as well as time to onset of exothermicity, were measured by differential scanning calorimetry using a TA Instruments 2920 differential scanning calorimeter. Samples were weighed and hermetically sealed into aluminum sample pans. Each sample was analyzed through two heating ramps to allow for the heat of reaction to be separated from other thermal transitions. Calculations were performed on the initial ramp with the second heating ramp subtracted. Each heating ramp consisted of thermal equilibration at 25° C., a temperature ramp at 200° C. to the target temperature, and 10 minutes at the target temperature. Time zero is defined as the time when the measured temperature first reaches the target temperature. Exotherm onset is defined as the time when heat flow becomes negative (exothermic). Initial heat flow is low, but positive, as sample temperature lags measured temperature. The normalization of the heat as kilojoules per mole of carbon-carbon double bonds (kJ/mol of C=C) is based on the carbon-carbon double bonds in the acryloyl monomer and ignores the carbon-carbon bonds contributed by the methacrylate-capped poly(arylene ether). The normalized values may be compared to a maximum of 47.9 kJ/mol expected for complete curing. The results show that compositions having initiator and inhibitor concentrations according to the invention exhibit useful inhibition times (manifested as the exotherm onset time) while maintaining rapid curing times (indicated by comparisons of kJ/mol of C=C at 90 seconds and 10 minutes). For example, the sample corresponding to Example 11 exhibited an exotherm onset time of 25.5 second, yet it was nearly fully cured in 90 seconds. This combination of properties has practical utility in terms of its ability to exhibit adequate mold flow at short molding cycles.

TABLE 3

|  | Ex. 4 | Ex. 5 | Ex. 6 |
|---|---|---|---|
| Ethoxylated (2) bisphenol A dimethacrylate (pph) | 83.7 | 90.00 | 96.2 |
| MA-PPE (pph) | 15.1 | 8.5 | 2.1 |
| Dicumyl peroxide (pph) | 1 | 1 | 1 |
| Dicumyl peroxide (mol/g) | $3.70 \times 10^{-5}$ | $3.70 \times 10^{-5}$ | $3.70 \times 10^{-5}$ |
| 4-t-Butyl catechol (pph) | 0.25 | 0.50 | 0.75 |
| 4-t-Butyl catechol (mol/g) | $3.01 \times 10^{-5}$ | $6.02 \times 10^{-5}$ | $9.02 \times 10^{-5}$ |
| Heat (J/g) after 90 sec at 147° C. | 74.7 | 0.5 | 0 |
| Heat (J/g) after 10 min at 147° C. | 147.7 | 2.1 | 0 |
| Heat (kJ/mol of C=C) after 90 sec at 147° C. | 20.2 | 0.1 | 0 |
| Heat (kJ/mol of C=C) after 10 min at 147° C. | 39.9 | 0.5 | 0 |
| Exotherm onset at 147° C. (sec) | 30.7 | 38.9 | — |
| Heat (J/g) after 90 sec at 157° C. | 128.8 | 109.7 | 35.9 |
| Heat (J/g) after 10 min at 157° C. | 186.9 | 171.5 | 201.9 |
| Heat (kJ/mol of C=C) after 90 sec at 157° C. | 34.8 | 27.5 | 8.4 |
| Heat (kJ/mol of C=C) after 10 min at 157° C. | 50.5 | 43.1 | 47.4 |
| Exotherm onset at 157° C. (sec) | 22.6 | 28.4 | — |
|  | Ex. 7 | Ex. 8 | Ex. 9 |
| Acrylate monomer (pph) | 88.3 | 95.0 | 88.5 |
| MA-PPE (pph) | 8.5 | 1.5 | 7.8 |
| Dicumyl peroxide (pph) | 3 | 3 | 3 |
| Dicumyl peroxide (mol/g) | $1.10 \times 10^{-4}$ | $1.10 \times 10^{-4}$ | $1.10 \times 10^{-4}$ |
| 4-t-Butyl catechol (pph) | 0.25 | 0.50 | 0.75 |
| 4-t-Butyl catechol (mol/g) | $3.01 \times 10^{-5}$ | $6.02 \times 10^{-5}$ | $9.02 \times 10^{-5}$ |
| Heat (J/g) after 90 sec at 147° C. | 136.8 | 96.7 | 13.3 |
| Heat (J/g) after 10 min at 147° C. | 184.0 | 202.0 | 162.3 |
| Heat (kJ/mol of C=C) after 90 sec at 147° C. | 35.0 | 23.0 | 3.4 |
| Heat (kJ/mol of C=C) after 10 min at 147° C. | 347.1 | 48.1 | 41.4 |
| Exotherm onset at 147° C. (sec) | 21.6 | 28.4 | 26.1 |
| Heat (J/g) after 90 sec at 157° C. | 186.0 | 217.2 | 157.6 |
| Heat (J/g) after 10 min at 157° C. | 197.1 | 252.7 | 184.8 |
| Heat (kJ/mol of C=C) after 90 sec at 157° C. | 47.6 | 51.7 | 40.2 |
| Heat (kJ/mol of C=C) after 10 min at 157° C. | 50.4 | 60.1 | 47.2 |
| Exotherm onset at 157° C. (sec) | 11.7 | 18.4 | 28.2 |
|  | Ex. 10 | Ex. 11 | Ex. 12 |
| Acrylate monomer (pph) | 90.6 | 91.7 | 92.7 |
| MA-PPE (pph) | 4.2 | 2.8 | 1.6 |
| Dicumyl peroxide (pph) | 5 | 5 | 5 |
| Dicumyl peroxide (mol/g) | $1.85 \times 10^{-4}$ | $1.85 \times 10^{-4}$ | $1.85 \times 10^{-4}$ |
| 4-t-Butyl catechol (pph) | 0.25 | 0.50 | 0.75 |

TABLE 3-continued

| 4-t-Butyl catechol (mol/g) | $3.01 \times 10^{-5}$ | $6.02 \times 10^{-5}$ | $9.02 \times 10^{-5}$ |
|---|---|---|---|
| Heat (J/g) after 90 sec at 147° C. | 178.6 | 186.1 | 82.3 |
| Heat (J/g) after 10 min at 147° C. | 184.8 | 194.5 | 192.9 |
| Heat (kJ/mol of C=C) after 90 sec at 147° C. | 44.6 | 45.9 | 20.1 |
| Heat (kJ/mol of C=C) after 10 min at 147° C. | 46.1 | 47.9 | 47.0 |
| Exotherm onset at 147° C. (sec) | 21.6 | 25.5 | 29.3 |
| Heat (J/g) after 90 sec at 157° C. | 187.1 | 220.7 | 198.5 |
| Heat (J/g) after 10 min at 157° C. | 195.2 | 233.8 | 212.0 |
| Heat (kJ/mol of C=C) after 90 sec at 157° C. | 46.7 | 54.5 | 48.4 |
| Heat (kJ/mol of C=C) after 10 min at 157° C. | 48.7 | 57.6 | 51.7 |
| Exotherm onset at 157° C. (sec) | 9.8 | 15.2 | 22.3 |

EXAMPLES 13–28,

COMPARATIVE EXAMPLES 8–12

Nineteen compositions were prepared, with variations in the concentrations of initiator (dicumyl peroxide) and inhibitor (t-butylcatechol). All samples contained 10 parts by weight of methacrylate-capped poly(2,6-dimethyl-1,4-phenylene ether) (MA-PPE) having an intrinsic viscosity of about 0.30 dL/g, and 40 parts by weight of ethoxylated (2) bisphenol A dimethacrylate, obtained as SR-348 from Sartomer. Curing rates were studied by dielectric cure monitoring using an ICAM-1500 Cure Analyzer obtained from Holometric Micromet. Log(ion viscosity) was monitored as a function of time at constant cure temperature of 160° C. Responses obtained in this study included the critical points "CP2," "CP3," and "CP4." CP2 corresponds to the time at which ion viscosity reaches a minimum. CP3 corresponds to the time of maximum cure rate (i.e., maximum slope, d(log ion viscosity)/dt). CP4 corresponds to the time at which the slope, d(log ion viscosity, in ohm-cm)/d(time, in minutes), is unity and approximates the endpoint of curing. Compositions and results are summarized in Table 4. All component amounts are expressed in parts by weight. Initiator and inhibitor amounts are also expressed in parts per hundred weight resin (phr), which corresponds to parts by weight per 100 parts poly(arylene ether) and olefinically unsaturated monomer. The weight ratio of initiator to inhibitor is also given. All values of CP2, CP3, and CP4 are expressed in seconds and represent the average of two runs. Use of "(gelled)" in Table 4 indicates that the composition cured to a gelled form before the experiment could be initiated in the instrument. Use of "(no cure)" in Table 4 indicates that the sample did not cure substantially within the 200 second timeframe of the experiment. Statistical analysis of the results showed that the curing endpoint CP4 was highly correlated with the concentration of inhibitor, concentration of initiator, and the square of the concentration of initiator. The results further show that the inventive examples provide a desirable combination of time at low viscosity (allowing flow within the mold as curing begins), and time to nearly complete curing (allowing rapid molding cycle times).

TABLE 4

|  | Ex. 13 | Ex. 14 | C. Ex. 8 | Ex. 15 | C. Ex. 9 | Ex. 16 | C. Ex. 10 | Ex. 17 |
|---|---|---|---|---|---|---|---|---|
| MA-PPE, IV = 0.30 | 10 | 10 | 10 | 10 | 10 | 10 | 10 | 10 |
| Ethoxylated (2) bisphenol A dimethacrylate | 40 | 40 | 40 | 40 | 40 | 40 | 40 | 40 |
| 4-t-Butylcatechol (pbw) | 0.125 | 0.125 | 0.000 | 0.125 | 0.000 | 0.250 | 0.250 | 0.125 |
| 4-t-Butylcatechol (phr) | 0.250 | 0.250 | 0.000 | 0.250 | 0.000 | 0.500 | 0.500 | 0.250 |
| Dicumyl peroxide (pbw) | 2.500 | 1.250 | 2.500 | 1.250 | 0.000 | 1.250 | 0.000 | 1.250 |
| Dicumyl peroxide (phr) | 5.000 | 2.500 | 5.000 | 2.500 | 0.000 | 2.500 | 0.000 | 2.500 |
| Initiator:inhibitor | 20 | 10 | — | 10 | — | 5 | 0 | 10 |
| CP2 - time at minimum viscosity | 21.2 | 26.5 | (gelled) | 25.4 | (gelled) | 27.5 | (no cure) | 25.8 |
| CP3 - time at maximum cure rate | 33.3 | 43.8 | (gelled) | 40.5 | (gelled) | 49.6 | (no cure) | 43.3 |
| CP4 - time at unity slope | 62.2 | 73.8 | (gelled) | 65.4 | (gelled) | 79.9 | (no cure) | 71.2 |

|  | Ex. 18 | Ex. 19 | C. Ex. 11 | C. Ex. 12 | Ex. 20 | Ex. 21 | Ex. 22 | Ex. 23 |
|---|---|---|---|---|---|---|---|---|
| MA-PPE, IV = 0.30 | 10 | 10 | 10 | 10 | 10 | 10 | 10 | 10 |
| Ethoxylated (2) bisphenol A dimethacrylate | 40 | 40 | 40 | 40 | 40 | 40 | 40 | 40 |
| 4-t-Butylcatechol (pbw) | 0.125 | 0.125 | 0.125 | 0.000 | 0.250 | 0.125 | 0.200 | 0.125 |
| 4-t-Butylcatechol (phr) | 0.250 | 0.250 | 0.250 | 0.000 | 0.500 | 0.250 | 0.400 | 0.250 |
| Dicumyl peroxide (pbw) | 1.250 | 1.250 | 0.000 | 1.250 | 2.500 | 2.000 | 1.250 | 0.500 |
| Dicumyl peroxide (phr) | 2.500 | 2.500 | 0.000 | 2.500 | 5.000 | 4.000 | 2.500 | 1.000 |
| Initiator:inhibitor | 10 | 10 | 0 | — | 10 | 16 | 6.25 | 4 |
| CP2 - time at minimum viscosity | 22.7 | 20.0 | (no cure) | (gelled) | 17.8 | 21.1 | 19.8 | 23.6 |
| CP3 - time at maximum cure rate | 39.1 | 41.8 | (no cure) | (gelled) | 41.2 | 35.6 | 48.5 | 55.7 |
| CP4 - time at unity slope | 68.2 | 75.0 | (no cure) | (gelled) | 72.0 | 66.1 | 70.6 | 88.2 |

TABLE 4-continued

|  | Ex. 24 | Ex. 25 | Ex. 26 | Ex. 27 | Ex. 28 |
|---|---|---|---|---|---|
| MA-PPE, IV = 0.30 | 10 | 10 | 10 | 10 | 10 |
| Ethoxylated (2) bisphenol A dimethacrylate | 40 | 40 | 40 | 40 | 40 |
| 4-t-Butylcatechol (pbw) | 0.200 | 0.050 | 0.050 | 0.050 | 0.200 |
| 4-t-Butylcatechol (phr) | 0.400 | 0.100 | 0.100 | 0.100 | 0.400 |
| Dicumyl peroxide (pbw) | 0.500 | 0.500 | 1.250 | 2.000 | 2.000 |
| Dicumyl peroxide (phr) | 1.000 | 1.000 | 2.500 | 4.000 | 4.000 |
| Initiator:inhibitor | 2.5 | 10 | 25 | 40 | 10 |
| CP2 - time at minimum viscosity | 24.8 | 28.3 | 18.3 | 16.8 | 20.4 |
| CP3 - time at maximum cure rate | 67.7 | 48.0 | 33.0 | 26.8 | 39.8 |
| CP4 - time at unity slope | 98.7 | 79.0 | 57.6 | 60.0 | 70.7 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A curable composition, comprising:
   a functionalized poly(arylene ether);
   an olefinically unsaturated monomer;
   about 0.2 to about 5 part by weight of a curing initiator per 100 parts by weight total of the functionalized poly(arylene ether) and the olefinically unsaturated monomer; and
   about 0.005 to about 1 part by weight of a curing inhibitor per 100 parts by weight total of the functionalized poly(arylene ether) and the olefinically unsaturated monomer;
   wherein the weight ratio of the curing initiator to the curing inhibitor is about 1.2:1 to about 50:1; and
   wherein the functionalized poly(arylene ether) resin is a capped poly(arylene ether) resin having the formula $Q(J-K)_y$ wherein Q is the residuum of a monohydric, dihydric, or polyhydric phenol; y is 1 to 100; J has the formula

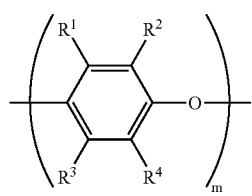

wherein $R^1$ and $R^3$ are each independently selected from the group consisting of hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy, wherein at least two carbon atoms separate the halogen and oxygen atoms; $R^2$ and $R^4$ are each independently selected from the group consisting of halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; m is 1 to about 200; and K is a capping group selected from the group consisting of

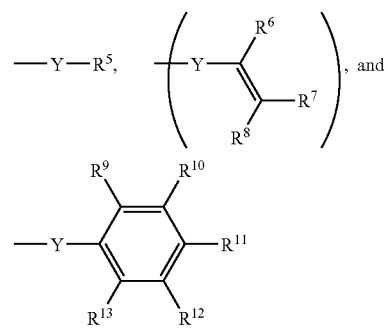

wherein $R^5$ is $C_1$–$C_{12}$ hydrocarbyl optionally substituted with one or two carboxylic acid groups, $R^6$–$R^8$ are each independently hydrogen, $C_1$–$C_{18}$ hydrocarbyl optionally substituted with one or two carboxylic acid groups, $C_2$–$C_{18}$ hydrocarbyloxycarbonyl, nitrile, formyl, carboxylic acid, imidate, and thiocarboxylic acid; $R^9$–$R^{13}$ are each independently selected from the group consisting of hydrogen, halogen, $C_1$–$C_{12}$ alkyl, hydroxy, carboxylic acid, and amino; and wherein Y is a divalent group selected from the group consisting of

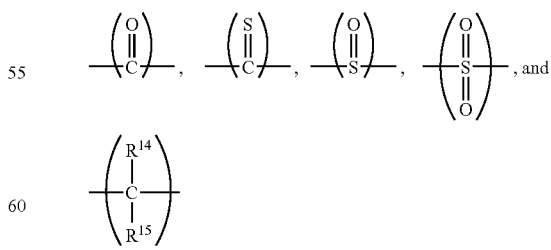

wherein $R^{14}$ and $R^{15}$ are each independently selected from the group consisting of hydrogen and $C_1$–$C_{12}$ alkyl.

2. The curable composition of claim 1, comprising at least about 1 part by weight of the curing initiator.

3. The curable composition of claim 1, comprising at least 100 micromoles of curing initiator per gram of resin, wherein resin consists of the functionalized poly(arylene ether) and the olefinically unsaturated monomer.

4. The curable composition of claim 1, comprising at least about 0.05 part by weight of the curing inhibitor.

5. The curable composition of claim 1, comprising at least 50 micromoles of curing inhibitor per gram of resin, wherein resin consists of the functionalized poly(arylene ether) and the olefinically unsaturated monomer.

6. The curable composition of claim 1, wherein the weight ratio of the curing initiator to the curing inhibitor is about 2:1 to about 20:1.

7. The curable composition of claim 1, wherein the molar ratio of the curing initiator to the curing inhibitor is about 20:1 to about 1:1.

8. The curable composition of claim 1, wherein Q is the residuum of a monohydric phenol.

9. The curable composition of claim 1, wherein the functionalized poly(arylene ether) is a capped poly(arylene ether) comprising at least one capping group having the structure

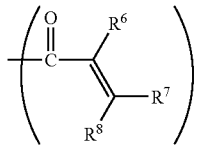

wherein each occurrence of $R^6$–$R^8$ is independently hydrogen, $C_1$–$C_{18}$ hydrocarbyl optionally substituted with one or two carboxylic acid groups, $C_2$–$C_{12}$ hydrocarbyloxycarbonyl, nitrile, formyl, carboxylic acid, imidate, and thiocarboxylic acid.

10. The curable composition of claim 1, wherein the functionalized poly(arylene ether) has a number average molecular weight of about 1,000 to about 20,000 atomic mass units.

11. The curable composition of claim 1, comprising about 5 to about 90 parts by weight of the functionalized poly(arylene ether) per 100 parts by weight total of the functionalized poly(arylene ether) and the olefinically unsaturated monomer.

12. The curable composition of claim 1, wherein the olefinically unsaturated monomer comprises an alkenyl aromatic monomer, an allylic monomer, an acryloyl monomer, or a mixture thereof.

13. The curable composition of claim 1, wherein the olefinically unsaturated monomer comprises an alkenyl aromatic monomer having the formula

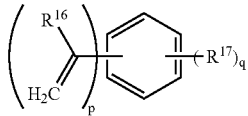

wherein each occurrence of $R^{16}$ is independently hydrogen or $C_1$–$C_{18}$ hydrocarbyl; each occurrence of $R^{17}$ independently halogen, $C_1$–$C_{12}$ alkyl, $C_1$–$C_{12}$ alkoxyl, or $C_6$–$C_{18}$ aryl; p is 1 to 4; and q is 0 to 5.

14. The curable composition of claim 1, wherein the olefinically unsaturated monomer comprises an alkenyl aromatic monomer selected from styrene, α-methylstyrene, 2-methylstyrene, 3-methystyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and combinations thereof.

15. The curable composition of claim 1, wherein the olefinically unsaturated monomer comprises styrene.

16. The curable composition of claim 1, wherein the olefinically unsaturated monomer comprises an allylic monomer selected from diallyl phthalate, diallyl isophthalate, triallyl mellitate, triallyl mesate, triallyl benzenes, triallyl cyanurate, triallyl isocyanurate, mixtures thereof, and partial polymerization products prepared therefrom.

17. The curable composition of claim 1, wherein the olefinically unsaturated monomer comprises an acryloyl monomer comprising least one acryloyl moiety having the structure

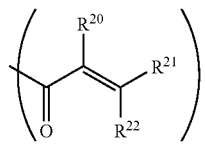

wherein $R^{20}$–$R^{22}$ are each independently selected from hydrogen, $C_1$–$C_{12}$ hydrocarbyl, $C_2$–$C_{18}$ hydrocarbyloxycarbonyl, nitrile, formyl, carboxylic acid, imidate, and thiocarboxylic acid.

18. The curable composition of claim 1, wherein the olefinically unsaturated monomer comprises an acryloyl monomer comprising at least two acryloyl moieties.

19. The curable composition of claim 1, wherein the olefinically unsaturated monomer comprises an acryloyl monomer selected from trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl (meth)acrylate, methacryloxypropyl trimethoxysilane, ethoxylated (2) bisphenol A di(meth)acrylate, and mixtures thereof.

20. The curable composition of claim 1, comprising about 10 to about 95 parts by weight of the olefinically unsaturated monomer per 100 parts by weight total of the functionalized poly(arylene ether) and the olefinically unsaturated monomer.

21. The curable composition of claim 1, wherein the curing initiator is selected from benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, 2,3-dimethyl-2,3-diphenylbutane, 2,3-trimethylsilyloxy-2,3-diphenylbutane, and mixtures thereof.

22. The curable composition of claim 1, wherein the curing initiator comprises dicumyl peroxide, t-butyl peroxybenzoate, or a mixture thereof.

23. The curable composition of claim 1, wherein the curing inhibitor is selected from diazoaminobenzene, phenylacetylene, sym-trinitrobenzene, p-benzoquinone, acetaldehyde, aniline condensates, N,N'-dibutyl-o-phenylenediamine, N-butyl-p-aminophenol, p-methoxyphenol, 2,4,6-triphenylphenoxyl, pyrogallol, catechol, hydroquinone, monoalkylhydroquinones, t-butylhydroquinone, $C_1$–$C_6$-alkyl-substituted catechols, 4-t-butylcatechol, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and mixtures thereof.

24. The curable composition of claim 1, wherein the curing inhibitor comprises hydroquinone, p-methoxyphenol, t-butylhydroquinone, 4-t-butylcatechol, or a mixture thereof.

25. The curable composition of claim 1, wherein the curing inhibitor comprises an uncapped poly(arylene ether).

26. The curable composition of claim 1, further comprising about 5 to about 95 weight percent of a particulate filler, based on the total weight of the composition.

27. The curable composition of claim 26, wherein the particulate filler comprises fused silica.

28. The curable composition of claim 1, having a spiral flow of at least about 70 centimeters measured at a temperature in the range of about 140 to about 180° C. and a pressure in the range of about 3 to about 7 megapascals.

29. The curable composition of claim 1, having a Shore D hardness measured at curing temperature of at least 70 after curing for 120 seconds at a curing temperature in the range of about 140 to about 180° C.

30. The curable composition of claim 1, exhibiting a d(log ion viscosity)/d(time) value of 1 ohm-centimeter/minute, measured by dielectric cure monitoring, after curing at 160° C. for a time in the range of about 50 to about 110 seconds.

31. A curable composition, comprising:
a functionalized poly(arylene ether) comprising a (meth) acrylate-capped poly(2,6-dimethyl-1,4-phenylene ether) resin, a(meth)acrylate-capped poly(2,6-dimethyl-1,4-phenylene ether-co-2,3,6-trimethyl-1,4-phenylene ether) resin, or a mixture thereof;
an acryloyl monomer comprising at least two acryloyl moieties;
a particulate filler;
about 0.2 to about 5 parts by weight of a curing initiator per 100 parts by weight total of the functionalized poly(arylene ether) and the acryloyl monomer; wherein the curing initiator is selected from benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and mixtures thereof; and
about 0.005 to about 1 part by weight of a curing inhibitor per 100 parts by weight total of the functionalized poly(arylene ether) and the acryloyl monomer; wherein the curing inhibitor is selected from diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$–$C_6$-alkyl-substituted catechols, 4-t-butylcatechol, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and mixtures thereof;
wherein the weight ratio of the curing initiator to the curing inhibitor is about 1.2:1 to about 50:1.

32. A curable composition, comprising:
about 5 to about 90 parts by weight of a methacrylate-capped poly(2,6-dimethyl-1,4-phenylene ether);
about 10 to about 95 parts by weight of an ethoxylated bisphenol A dimethacrylate;
about 200 to about 2000 parts by weight of fused silica;
about 0.2 to about 5 parts by weight of dicumyl peroxide; and
about 0.005 to about 1 part by weight of 4-t-butylcatechol;
wherein all parts by weight are based on 100 parts by weight total of the methacrylate-capped poly(2,6-dimethyl-1,4-phenylene ether) and the ethoxylated bisphenol A dimethacrylate; and
wherein the weight ratio of the curing initiator to the curing inhibitor is about 2:1 to about 20:1.

33. A cured composition, comprising the reaction products obtained by curing the curable composition of claim 1.

34. A cured composition, comprising the reaction products obtained by curing the curable composition of claim 31.

35. A cured composition, comprising the reaction products obtained by curing the curable composition of claim 32.

36. An article comprising the cured composition of claim 33.

37. An article comprising the cured composition of claim 34.

38. An article comprising the cured composition of claim 35.

39. A method of forming a curable composition, comprising:
blending
a functionalized poly(arylene ether); wherein the functionalized poly(arylene ether) resin is a capped poly (arylene ether) resin having the formula Q(J-K)$_y$, wherein Q is the residuum of a monohydric, dihydric, or polyhydric phenol; y is 1 to 100; J has the formula

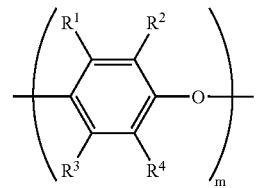

wherein $R^1$ and $R^3$ are each independently selected from the group consisting of hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1-C_{12}$ hydroxyalkyl, phenyl, $C_1-C_{12}$ haloalkyl, $C_1-C_{12}$ hydrocarbyloxy, and $C_2-C_{12}$ halohydrocarbyloxy wherein at least two carbon atoms separate the halogen and oxygen atoms; $R^2$ and $R^4$ are each independently selected from the group consisting of halogen, primary or secondary $C_1-C_{12}$ alkyl, $C_2-C_{12}$ alkenyl, $C_2-C_{12}$ alkynyl, $C_1-C_{12}$ aminoalkyl, $C_1-C_{12}$ hydroxyalkyl, phenyl, $C_1-C_{12}$ haloalkyl, $C_1-C_{12}$ hydrocarbyloxy, and $C_2-C_{12}$ halohydrocarbyloxy wherein at least two carbon atoms separate the halogen and oxygen atoms; m is 1 to about 200; and K is a capping group selected from the group consisting of

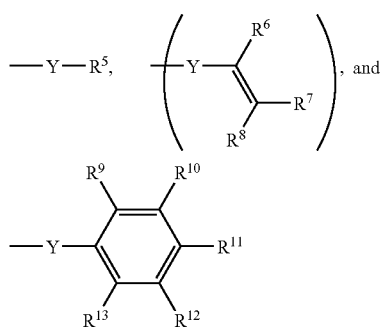

wherein $R^5$ is $C_1-C_{12}$ hydrocarbyl optionally substituted with one or two carboxylic acid groups, $R^6-R^8$ are each independently hydrogen, $C_1-C_{18}$ hydrocarbyl optionally substituted with one or two carboxylic acid groups, $C_2-C_{18}$ hydrocarbyloxycarbonyl, nitrile, formyl, carboxylic acid, imidate, and thiocarboxylic acid; $R^9-R^{13}$ are each independently selected from the group consisting of hydrogen, halogen, $C_1-C_{12}$ alkyl, hydroxy, carboxylic acid, and amino; and wherein Y is a divalent group selected from the group consisting of

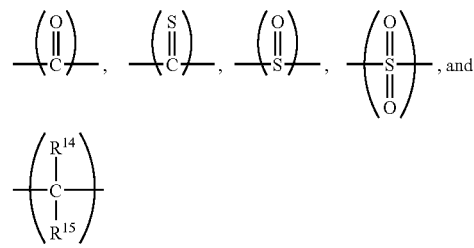

wherein $R^{14}$ and $R^{15}$ are each independently selected from the group consisting of hydrogen and $C_1-C_{12}$ alkyl;
an olefinically unsaturated monomer;
about 0.2 to about 5 parts by weight of a curing initiator per 100 parts by weight total of the functionalized poly(arylene ether) and the olefinically unsaturated monomer; and
about 0.005 to about 1 part by weight of a curing inhibitor per 100 parts by weight total of the functionalized poly(arylene ether) and the olefinically unsaturated monomer;
to form an intimate blend; wherein the weight ratio of the curing initiator to the curing inhibitor is about 1.2:1 to about 50:1.

* * * * *

UNITED STATES PATENT AND TRADEMARK OFFICE
CERTIFICATE OF CORRECTION

PATENT NO. : 7,067,595 B2
APPLICATION NO. : 10/678459
DATED : June 27, 2006
INVENTOR(S) : Kenneth Paul Zarnoch et al.

Page 1 of 1

It is certified that error appears in the above-identified patent and that said Letters Patent is hereby corrected as shown below:

Column 3,
Line 63, after "sulfonyl" delete "sulfinyl" and insert therefor -- sulfuryl --.

Column 5,
Line 11, after "preferably" delete "$C_1$-$C_{12}$" and insert therefor -- $C_1$-$C_6$ --.

Column 9,
Line 29, after "di(meth)acrylate" delete "isobomyl" and insert therefor -- isobornyl --.

Column 15,
Line 62, after "as" delete "HYSOLO" and insert therefor -- HYSOL® --.

Signed and Sealed this

Twenty-seventh Day of March, 2007

JON W. DUDAS
*Director of the United States Patent and Trademark Office*